United States Patent [19]

Fischer

[11] 4,209,437

[45] Jun. 24, 1980

[54] EXTRACTION RESISTANT LIQUID ETHYLENE-VINYL ACETATE COPOLYMER PLASTICIZED POLYVINYL CHLORIDE RESIN

[75] Inventor: Joseph Fischer, Cincinnati, Ohio

[73] Assignee: National Distillers and Chemical Corporation, New York, N.Y.

[21] Appl. No.: 924,465

[22] Filed: Jul. 14, 1978

[51] Int. Cl.$^2$ .......................... C08K 5/10; C08K 5/11
[52] U.S. Cl. .......................... 260/31.8 R; 260/30.6 R; 260/31.2 R; 260/31.8 M
[58] Field of Search .................. 260/31.8 M, 31.2 R, 260/31.8 R

[56] References Cited

U.S. PATENT DOCUMENTS

| | | | |
|---|---|---|---|
| 2,657,188 | 10/1953 | Denison | 260/31.6 |
| 3,165,491 | 1/1965 | Butzler et al. | 260/31.8 M |
| 3,517,083 | 6/1970 | Lalyer | 260/31.8 M |
| 3,760,036 | 9/1973 | Matthews | 260/31.8 M |
| 4,041,002 | 8/1977 | Aboshi et al. | 260/31.8 M |
| 4,081,413 | 3/1978 | Tybus | 260/31.8 M |

Primary Examiner—Joseph L. Schofer
Assistant Examiner—Peter F. Kulkosky
Attorney, Agent, or Firm—Kenneth D. Tremain

[57] ABSTRACT

Polyvinyl chloride resin compounded with a plasticizer composition containing a monomeric ester and a liquid ethylene-vinyl acetate copolymer demonstrates significantly reduced levels of extractibles and low plasticizer migration while at the same time retaining good low temperature performance.

12 Claims, No Drawings

EXTRACTION RESISTANT LIQUID ETHYLENE-VINYL ACETATE COPOLYMER PLASTICIZED POLYVINYL CHLORIDE RESIN

BACKGROUND OF THE INVENTION

1. Field of the Invention

This invention relates, inter alia, to the field of plasticized vinyl chloride polymers, and more particularly, to such polymers plasticized with a plasticizer composition containing monomeric ester and ethylene-vinyl acetate copolymer.

2. Description of the Prior Art

The use of plasticizers as adjuncts for synthetic thermoplastic resins has for many years been a universal and necessary practice, dictated by the need to modify the performance characteristics of host resins to satisfy particular product service requirements.

The term "plasticizer" is widely acknowledged to refer to those substances which, when added to thermoplastic resins, impart and maintain the flexibility of the resins during the useful lifespan of articles fabricated therefrom. In its larger import, the term "plasticizer" can be understood to include any additive of a thermoplastic resin which significantly modifies a major mechanical property of the resin such as, for example, impact resistance.

One of the principal classes of thermoplastic resins, those belonging to the vinyl chloride polymer group, have been compounded with a wide variety of individual plasticizers and plasticizer mixtures in order to provide a composite blend or polyalloy demonstrating desirable physical and mechanical properties not possessed by the unalloyed polymer. The monomeric esters such as dioctyl phthalate (DOP) and dioctyl adipate (DOA) have figured prominently as plasticizers for polyvinyl chloride resins since they are efficient and impart good low temperature performance characteristics to these polymers. However, these and similar monomeric plasticizers, all being relatively volatile substances, tend in time to diffuse from the host resin with several disadvantageous consequences. Loss and/or migration of plasticizer is necessarily accompanied by a proportionate loss of flexibility of the host resin and the attendant embrittlement of the polymer article results in a curtailed product lifespan. In certain end use applications, a high rate of plasticizer diffusion cannot be tolerated. So, for example, polyvinyl chloride tubing for medical applications must not give off any significant quantities of plasticizer.

It has previously been proposed to employ polymeric plasticizers for vinyl chloride resins for the reason that such materials, being less volatile than the monomeric plasticizers, will have less of a tendency to migrate within, and volatize from, the host resin. U.S. Pat. No. 4,003,963 describes a blend of polyvinyl chloride and polyvinyl alcohol, the latter containing up to 3% by weight of residual vinyl acetate groups. The blends are said to possess enhanced resistance to gas permeability and moisture vapor transmission. U.S. Pat. No. 3,968,184 describes impact-resistant blends of polyvinyl chloride and ethylene-vinyl acetate copolymers on which have been grafted units of aromatic vinyl compounds, (meth) acrylonitrile and aliphatic monoolefins. Similarly, U.S. Pat. No. 3,960,986 describes a blend of polyvinyl chloride and a vinyl chloride grafted copolymer of ethylene and vinyl acetate, but in addition thereto, this patent also calls for the use of a small amount of ethylene-vinyl acetate copolymer. The blends can also contain lubricants such as alkyl esters of long-chained dicarboxylic acids and higher fatty acids. U.S. Pat. Nos. 3,888,948; 3,853,970; and 3,607,980 each relate to graft copolymers of ethylene-vinyl acetate copolymer and vinyl chloride demonstrating improved impact strength. U.S. Pat. No. 3,517,083 describes polyblends of polyvinyl chloride and a solid ethylene-vinyl acetate copolymer as an impact modifier. The polyblends can also contain a processing aid or co-plasticizer such as dioctyl phthalate.

Solid ethylene-vinyl acetate copolymers have limited efficiency as plasticizers for polyvinyl chloride compared with the monomeric plasticizers and must therefore be used at higher levels to achieve a level of plasticization comparable to that provided by the monomeric compounds. Not only does the need to use relatively large amounts of solid ethylene-vinyl acetate plasticizer offset in significant measure the economic advantages of the lower cost polyvinyl chloride base resin, the high concentrations of this plasticizer result in an overall diffusion of polymer from the host resin which is not unlike that of the more effective monomeric plasticizers. Moreover, plasticization of polyvinyl chloride with relatively high molecular weight materials such as solid ethylene-vinyl acetate copolymer tends to impair the physical properties of the polymer at low temperatures. Brittleness and optical haze are frequently encountered with polymer plasticized polyvinyl chloride resins at low temperatures.

While U.S. Pat. No. 2,657,188 describes the plasticization of polyvinyl chloride with liquid ethylene-vinyl acetate copolymer, investigation has shown that this plasticizer does not prevent a sharp reduction in low temperature performance of the polyalloy.

Accordingly, there exists a need for plasticized polyvinyl chloride resins having low cost, low extractible plasticizer systems which do not compromise the performance characteristics of the base resins at low temperatures.

SUMMARY OF THE INVENTION

It has surprisingly been discovered that migration and extraction resistant plasticization of vinyl chloride resins with little or no penalty in flexibility at low temperature can be achieved with the incorporation into the resins of a plasticizer mixture comprising liquid ethylene-vinyl acetate copolymer and monomeric ester.

The extractability of vinyl chloride resins formulated with the aforesaid mixture of plasticizers with such solvents as hexane is considerably reduced compared to plasticizer systems based on monomeric esters alone. This advantage is of particular value in those resin applications in which the toxicity of leached plasticizer is a persistent problem, for example, in food packaging and biomedical devices. Optical clarity, a key property of certain types of polyvinyl chloride blends, is retained with the plasticizer mixtures of this invention even at temperatures of 0° C. and below.

Briefly stated, the invention herein relates to vinyl chloride resins plasticized with from about 10 to about 60 parts by weight of a plasticizer mixture comprising from about 30 to about 70 parts by weight of a liquid copolymer ethylene-vinyl acetate and from about 70 to about 30 parts by weight of monomeric ester. Vinyl chloride resins formulated with the aforesaid plasticizer mixture demonstrate excellent resistance to extraction by common solvents while substantially retaining the physical properties of vinyl resins formulated with the more efficient, but more extractable, monomeric esters. Accordingly, vinyl chloride resins plasticized in accordance with the present invention are particularly well suited for applications demanding a high order of biological safety as in the aforestated areas of food packaging and biomedical devices.

DESCRIPTION OF THE PREFERRED EMBODIMENTS

The term "vinyl chloride resin" and terms of like import as used herein include graft copolymers as well as the ungrafted vinyl halide homopolymers and copolymers. The term also includes the post-halogenated vinyl halide resins, such as chlorinated polyvinyl chloride.

Among the vinyl chloride resins which are suitable for plasticization in accordance with the present invention are included PVC which is preferred; copolymers of vinyl chloride with vinyl esters, such as vinyl acetate; with acrylate esters, such as methyl, ethyl and propyl acrylate; with fumarate and maleate esters, such as diethyl fumarate and diethyl maleate; and with vinylidene chloride, vinyl fluoride, ethylene and other polymerizable ethylenically unsaturated compounds, as well as copolymers of vinyl chloride, vinyl acetate and maleic acid, and partially hydrolyzed copolymers of vinyl chloride with vinyl acetate. In the aforesaid vinyl chloride copolymers, vinyl chloride will generally be present in an amount of from about 80 to 99% by weight.

In addition to vinyl chloride resin, the plasticized resins herein can also contain minor amounts, i.e., up to about 20% by weight of the entire formulation, of one or more polymers/copolymers compatible with vinyl chloride resins. Among such polymers/copolymers are included polyamides; cellulose-derived polymers such as cellulose acetate, propionate, butyrate, regenerated cellulose and nitrocellulose; vinyl ethers, alpha-olefin based polymers having 2 to 12 carbon atoms, such as polyethylene, polypropylene, chlorosulfonated polyethylene, chlorinated polyethylene as well as other halogenated polyolefins; ionomers (ethylene/methacrylic acid copolymers neutralized with an alkali metal hydroxide), solid EVA copolymers such as vinyl acetate, vinyl propionate, vinyl butyrate and vinyl stearate containing from about 15 to about 98 vinyl ester and hydrolyzed polymers derived therefrom (ethylene/vinyl alcohol copolymer); polymers of styrene such as styrene/methacrylic acid, styrene/acrylonitrile; polymers of acrylonitrile such as polyacrylonitrile; copolymers of at least 40 percent acrylonitrile using other ethylenically unsaturated comonomers such as vinyl acetate, vinyl chloride; ethylene and isobutylene acrylics such as alkyl esters of ethylenically unsaturated carboxylic acids such as alkyl acrylates and alkyl methacrylates wherein the alkyl group is from 1 to 18 carbon atoms; polyesters such as polyethylene terephthalate and poly-1,4, cyclohexylene dimethylene terephthalate; polyurethanes; polycarbonates; phenolics; polysulfones; epoxy resins; chlorinated polyethers; alkyd resins; acetal resins; ABS resins; silicone resins; tars (asphalt) and waxes such as the petroleum waxes (paraffin wax and microcrystalline wax), and chlorinated waxes.

As previously stated, the plasticizer mixture of the present invention comprises liquid copolymer and monomeric ester. The preferred liquid ethylene-vinyl acetate copolymers herein will possess an average molecular weight within the range of from about 350 to about 1200 and a vinyl acetate content of from about 60 to about 80% by weight. The aforesaid range of vinyl acetate content has been found to be necessary when it is desired to produce optically clear blends of polyvinyl chloride resins. The more preferred liquid ethylene-vinyl acetate copolymers have an average molecular weight of from about 500 to about 1100 and a vinyl acetate content of from about 65 to about 75% by weight. Such ethylene-vinyl acetate copolymers are obtained by polymerization methods which are well known in the art, as for example, the polymerization procedure described in U.S. Pat. No. 2,657,188.

The monomeric ester component of the plasticizer mixtures of this invention include any of the organic and inorganic esters heretofore employed as polyvinyl chloride plasticizers. Among such esters which can be used herein with good results are alkyl phthalates such as dibutyl phthalate, diamyl phthalate, dioctyl phthalate, didecyl phthalate and di (2-ethylhexyl)phthalate; the alkyl and aryl phosphates such as tributyl phosphate, trioctyl phosphate and tricresyl phosphate; the alkyl adipates and sebacates such as dioctyl adipate and dihexyl sebacate; and, the glycollates such as methyl phthalyl ethyl glycollate, ethyl phthalyl ethyl glycollate and butyl phthalylbutyl glycollate. Dioctyl phthalate and dioctyl adipate are especially preferred for use herein.

The plasticizer mixtures herein contain from about 30 to about 70 parts by weight and preferably, from about 40 to about 60 parts by weight, of liquid ethylene-vinyl acetate copolymer, the balance of the mixture being made up of monomeric ester. In general, equal parts by weight of liquid ethylene-vinyl acetate copolymer and monomeric ester will provide entirely acceptable results. Optional additives, such as stabilizers, colorants, lubricants, etc., can be incorporated into the plasticized vinyl chloride resins herein as desired. These additives, when employed, should be utilized in such amounts that the vinyl resin/liquid ethylene-vinyl acetate copolymer plasticizer constitutes at least about 50% by weight of the total composition.

The blending of the vinyl chloride resins and plasticizer mixtures is readily carried out employing known and conventional techniques, e.g., by mixing in a Banbury mixer, on a two roll mill or in a screw extruder. The individual components of the plasticizer can be incorporated into the vinyl chloride resin sequentially or simultaneously. The blended resins are thermoplastically deformable and can be processed into finished articles such as film, tubes, and other configurations by the usual methods, e.g., extrusion and injection molding.

To demonstrate the superior resistance to extraction of a vinyl chloride resin plasticized in accordance with this invention as compared to the identical vinyl chloride resin plasticized with monoester plasticizer in the conventional manner two polyvinyl chloride formulations were prepared and then extrated with hexane and soapy water. The results of the extractions are set forth in Table 1 as follows:

TABLE

| | Polyvinyl Chloride Formulation | |
|---|---|---|
| | Parts | |
| Component | Control Resin | Resin of Invention |
| Polyvinyl Chloride Resin | 100.0 | 100.0 |

TABLE-continued

| Polyvinyl Chloride Formulation | | |
|---|---|---|
| | Parts | |
| Component | Control Resin | Resin of Invention |
| Dioctyl Phthalate | 40.0 | 20.0 |
| Paraplex G-62 (Rohm & Haas Co.) a polyester placticizer | 20.0 | 10.0 |
| Stabilizer | 0.5 | 0.5 |
| Liquid Ethylene-vinyl acetate copolymer plasticizer of 67.2% vinyl acetate content, average molecular weight of 1,000-2,000 and viscosity at 125° C. of 24 centipoises | — | 30.0 |
| Total Plasticizer | 60.0 | 60.0 |
| Properties | | |
| Tensile Strength (p.s.i.) at break | 2780 | 2840 |
| Modulus (p.s.i.) at 1% Secant | 2100 | 2200 |
| Elongation in % | 320 | 280 |
| Extractibles | | |
| Hexane in % | 16.8 | 4.2 |
| Soapy water in % | 0.21 | 0.11 |

While the physical properties of the resin prepared in accordance with this invention are only slightly affected, a dramatic reduction is seen in the hexane extractibles, i.e., from 16.8% for the control resin compared with 4.2% for the resin plasticized in accordance with this invention.

In Table II, below, a comparison is made of a highly plasticized polyvinyl chloride formulation prepared with two conventional monomeric ester plasticizers and two other plasticized polyvinyl chloride formulations, one of which replaces all the monomeric plasticizer with liquid ethylene-vinyl acetate copolymer and the other of which replaces only half the monomeric plasticizer with liquid ethylene-vinyl acetate copolymer. Among the properties of the plasticized polyvinyl chlorides which are set forth in Table II are the values for the relative modulus (stiffening) of the resins at low temperatures as measured by the method of Gehman (ASTM D 1053-73). In accordance with the Gehman method, the relative modulus of a resin at any temperature is defined as the ratio of the test temperature modulus to the modulus at 23° C. In Table II, the values $T_2$ and $T_{100}$ are the temperatures at which the relative modulus values are 2 and 100, respectively. Accordingly, the Gehman values reported herein reflect the extent to which the flexibility of the resins tested was affected by temperature.

Table II

| EVA - COPOLYMER/PLASTICIZER COMPARISON | | | |
|---|---|---|---|
| Polyvinyl chloride Resin | 100.0 | 100.0 | 100.0 |
| Dioctyl Phthalate | 65.0 | — | 35.0 |
| Dioctyl Adipate | 5.0 | — | — |
| Process Aid | 5.0 | 5.0 | 5.0 |
| Stabilizer | 3.0 | 3.0 | 3.0 |
| Liquid ethylene-vinyl acetate Copolymer of Table I Plasticizer | — | 70.0 | 70.0 |
| Total Plasticizer | 70.0 | 70.0 | 70.0 |
| PROPERTIES | | | |
| Hardness (Shore A) | 69 | 85 | 72 |
| Tensile Strength- (p.s.i.) at break | 1570 | 2100 | 2075 |
| Elongation in % | 375 | 410 | 440 |
| Tensile Modulus at 100% elongation | 680 | 1290 | 845 |
| Gehman Values in ° C. | | | |
| $T_2$ | −4 | +18 | −3 |
| $T_{100}$ | −37 | −6 | −22 |
| PROPERTIES AFTER AGING (250° F. for 14 DAYS) | | | |
| Hardness (Shore A) | 62 | 95 | 68 |
| Tensile Strength (p.s.i.) at break | 1605 | 2140 | 1685 |
| Elongation in % | 380 | 390 | 350 |
| Tensile Modulus at 100% Elongation | 715 | 1575 | 850 |

The poorer efficiency of liquid ethylene-vinyl acetate copolymer alone in plasticizing polyvinyl chloride is clearly shown in the results set forth in Table II. Hardness increases from 69 to 85 Shore A and tensile modulus increases from 680 p.s.i. to 1290 p.s.i. at 100% elongation. There is a very substantial change in low temperature performance with the Gehman test giving a $T_2$ value of 18° C. compared to −4° C. for the moomeric ester plasticizers. However, when half the monomeric ester plasticizer is replaced with liquid ethylene-vinyl acetate copolymer, there is only a slight change in hardness. But most surprisingly, the low temperature performance is largely retained, a phenomenon contrary to what one would expect based on experience with liquid ethylene-vinyl acetate copolymer plasticizer alone.

The results of the heat aging test shows that the permanence of the liquid ethylene-vinyl acetate copolymer is retained at elevated temperatures for extended periods of time and that this plasticizer in combination with the monomeric esters does not harden or lose key physical properties.

What is claimed is:

1. A plasticized vinyl chloride resin containing from about 10 to about 60 parts by weight of a plasticizer mixture comprising from about 30 to about 70 parts by weight of a liquid ethylene-vinyl acetate copolymer and from about 70 to about 30 parts by weight of at least one non-polymeric ester.

2. The plasticized vinyl chloride resin of claim 1 wherein the vinyl chloride resin is polyvinyl chloride.

3. The plasticized vinyl chloride resin of claim 1 wherein the liquid ethylene-vinyl acetate copolymer possesses an average molecular weight within the range of from about 350 to about 1200 and a vinyl acetate content from about 60 to about 80% by weight.

4. The plasticized vinyl chloride resin of claim 3 wherein the liquid ethylene-vinyl acetate copolymer possesses an average molecular weight within the range of from about 500 to about 1100 and a vinyl acetate content of from about 65 to about 75% by weight.

5. The plasticized vinyl chloride resin of claim 4 having a Gehman value at $T_2$ of about −3° C. and a Gehman value at $T_{100}$ of about −22° C.

6. The plasticized vinyl chloride resin of claim 1 wherein the non-polymeric ester is at least one member of the group consisting of dioctyl phthalate and dioctyl adipate.

7. A plasticizer mixture for vinyl chloride resins comprising from about 30 to about 70 parts by weight of a liquid ethylene-vinyl acetate copolymer and from about 70 to about 30 parts by weight of at least one non-polymeric ester.

8. A method for plasticizing vinyl chloride resin which comprises incorporating therein from about 10 to about 60 parts by weight of a plasticizer mixture comprising from about 30 to about 70 parts by weight of a liquid ethylene-vinyl acetate copolymer and from about 70 to about 30 parts by weight of at least one non-polymeric ester.

9. The method of claim 8 wherein the vinyl chloride resin is polyvinyl chloride.

10. The method of claim 8 wherein the liquid ethylene-vinyl acetate copolymer possesses an average molecular weight within the range of from about 350 to about 1200 and a vinyl acetate content from about 60 to 80% by weight.

11. The method of claim 10 wherein the liquid ethylene-vinyl acetate copolymer possesses an average molecular weight within the range of from about 500 to about 1100 and a vinyl acetate content of from about 65 to about 75% by weight.

12. The method of claim 8 wherein the non-polymeric ester is at least one member of the group consisting of dioctyl phthalate and dioctyl adipate.

* * * * *